United States Patent
Acosta et al.

[11] Patent Number: 5,909,778
[45] Date of Patent: Jun. 8, 1999

[54] HAND-HELD SOIL TILLING SYSTEM

[76] Inventors: Zelman Acosta; Luz M Acosta, both of 2137 N. Campbell, Chicago, Ill. 60647

[21] Appl. No.: 09/141,195

[22] Filed: Aug. 27, 1998

[51] Int. Cl.⁶ .............................. A01B 33/06; A01B 35/28
[52] U.S. Cl. ...................... 172/111; 172/329; 366/325.1; D7/379; D7/412
[58] Field of Search .............................. 366/325.4, 325.1, 366/325.2, 305, 282, 279; 172/111, 329; D7/412, 379, 387

[56] References Cited

U.S. PATENT DOCUMENTS

| | | |
|---|---|---|
| D. 183,371 | 8/1958 | Rutan . |
| D. 218,057 | 7/1970 | Gruska et al. . |
| D. 283,292 | 4/1986 | Ellis ..................................... D7/412 X |
| D. 332,722 | 1/1993 | Torbet et al. ............................ D7/412 |
| D. 393,180 | 4/1998 | VanWestrienen ........................ D7/412 |
| 2,515,555 | 7/1950 | Gratias . |
| 2,577,802 | 12/1951 | Payne . |
| 2,753,160 | 7/1956 | Gunn, Sr. . |
| 2,991,838 | 7/1961 | Lane ..................................... 172/111 X |
| 3,129,771 | 4/1964 | Lidstone .............................. 172/111 X |
| 3,154,297 | 10/1964 | Lovgren . |
| 3,215,410 | 11/1965 | McMaster et al. . |
| 4,892,156 | 1/1990 | Willis . |
| 5,048,617 | 9/1991 | Haven . |
| 5,054,559 | 10/1991 | Paul ..................................... 172/111 X |
| 5,435,396 | 7/1995 | Robichaux . |
| 5,491,963 | 2/1996 | Jerez ..................................... 172/111 X |

*Primary Examiner*—Christopher J. Novosad

[57] ABSTRACT

A hand-held soil tilling system including four tiller components. Each tiller component includes an elongated central extent that is formed with a point at its end. Each tiller component also includes an upper extent in a curved configuration terminating adjacent to a common axis of rotation. The tiller components being flared outwardly with the distance therebetween being greater adjacent to the lower ends than adjacent to the upper ends. A cylindrical coupling post which has an upper extent formed with projections and a flange to allow coupling with the electrical machine and a lower end adapted to receive thereadjacent the upper ends of the upper extents.

1 Claim, 2 Drawing Sheets

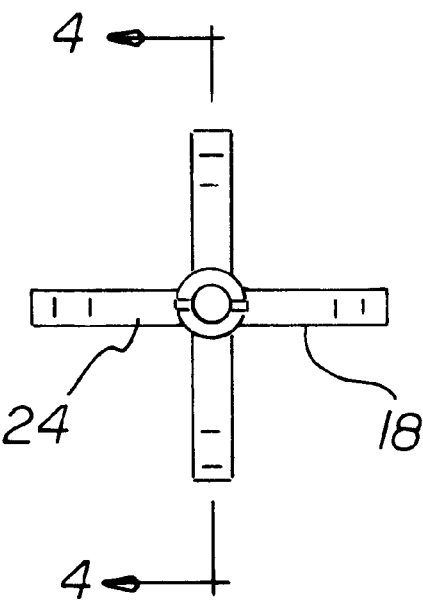
FIG 3
FIG 5
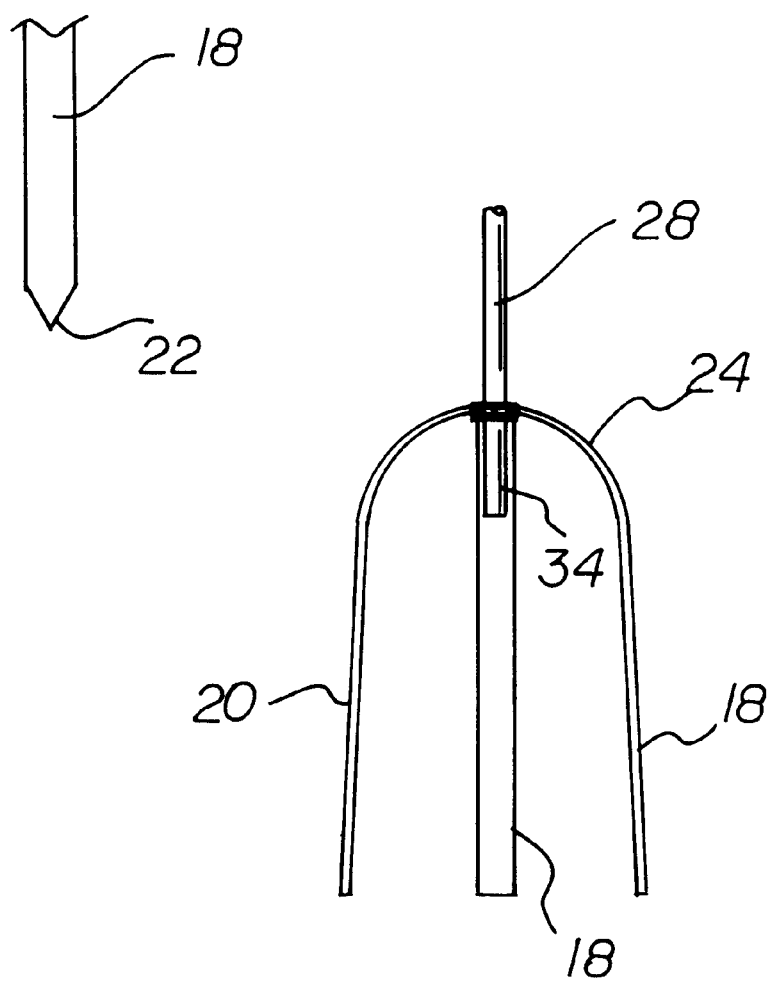
FIG 4

HAND-HELD SOIL TILLING SYSTEM

BACKGROUND OF THE INVENTION

1. Field of the Invention

The present invention relates to a hand-held soil tilling system and more particularly pertains to tilling the soil through the action of a hand-held beater with blades.

2. Description of the Prior Art

The use of soil tilling apparatuses of known designs and configurations is known in the prior art. More specifically, soil tilling apparatuses of known designs and configurations heretofore devised and utilized for tile purpose of tilling the soil through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,892,156 to Willis discloses a Garden Tool. U.S. Pat. No. 5,435,396 to Robichaux discloses a Hand Tiller Soil Cultivation System. U.S. Pat. No. Des. 332,722 to Torbet et al. discloses an Attachment for a Hand Mixer. U.S. Pat. No. Des. 283,292 to Ellis discloses an Eviscerating Tool Tip. U.S. Pat. No. 5,491,963 to Jerez discloses a Garden Cleaning Implement for Cutting/Macerating Weeds Above and Below Ground. Lastly, U.S. Pat. No. 5,048,617 to Haven discloses a Hand-Held Tiller Machine.

In this respect, the hand-held soil tilling system according to the present invention substantially departs from the conventional concepts and designs of the prior art, and in doing so provides an apparatus primarily developed for the purpose of tilling the soil through the action of a hand-held beater with blades.

Therefore, it can be appreciated that there exists a continuing need for a new and improved hand-held soil tilling system which can be used for tilling the soil through the action of a hand-held beater with blades. In this regard, the present invention substantially fulfills this need.

SUMMARY OF THE INVENTION

In view of the foregoing disadvantages inherent in the known types of soil tilling apparatuses of known designs and configurations now present in the prior art, the present invention provides an improved hand-held soil tilling system. As such, the general purpose of the present invention, which will be described subsequently in greater detail, is to provide a new and improved hand-held soil tilling system and method which has all the advantages of the prior art and none of the disadvantages.

To attain this, the present invention essentially comprises a new and improved hand-held soil tilling system for tilling the soil through the action of a hand-held beater with blades comprises, in combination a hand-held electrical machine which is adapted to receive a tool for selectively causing the rotation thereof. Also provided are four tiller components. Each tiller component includes an elongated central extent formed with a point at its end. Each tiller component also includes an upper extent in a curved configuration terminating adjacent to a common axis of rotation and with the length of each central extent being about two and three times greater than the radius of curvature of the upper extents. The tiller components are flared outwardly with the distance therebetween being greater adjacent to the lower ends than adjacent to the upper ends. Also provided is a cylindrical coupling post which has an upper extent formed with projections and a flange to allow coupling with the electrical machine and a lower end adapted to receive thereadjacent the upper ends of the upper extents.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hand-held soil tilling system which has all of the advantages of the prior art soil tilling apparatuses of known designs and configurations and none of the disadvantages.

It is another object of the present invention to provide a new and improved hand-held soil tilling system which may be easily and efficiently manufactured and marketed.

It is further object of the present invention to provide a new and improved hand-held soil tilling system which is of durable and reliable constructions.

An even further object of the present invention is to provide a new and improved hand-held soil tilling system which is susceptible of a low cost of manufacture with regard to both materials and labor, and which accordingly is then susceptible of low prices of sale to the consuming public, thereby making such hand-held soil tilling system economically available to the buying public.

Even still another object of the present invention is to provide a hand-held soil tilling system for tilling the soil through the action of a hand-held beater with blades.

Another object of the present invention is to provide a hand-held soil tilling system including four tiller components. Each tiller component includes an elongated central extent that is formed with a point at its end. Each tiller component also includes an upper extent in a curved configuration terminating adjacent to a common axis of rotation. The tiller components being flared outwardly with the distance therebetween being greater adjacent to the lower ends than adjacent to the upper ends. A cylindrical coupling post which has an upper extent formed with projections and a flange to allow coupling with the electrical machine and a lower end adapted to receive thereadjacent the upper ends of the upper extents.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top elevational view of the device shown in the prior FIGS.

FIG. 4 is a cross-sectional view taken along line 4—4 of FIG. 3.

FIG. 5 is an enlarged front elevational view of the bottom portion of one of the tiller component.

The same reference numerals refer to the same parts through the various FIGS.

DESCRIPTION OF THE PREFERRED EMBODIMENT

Figure 1:
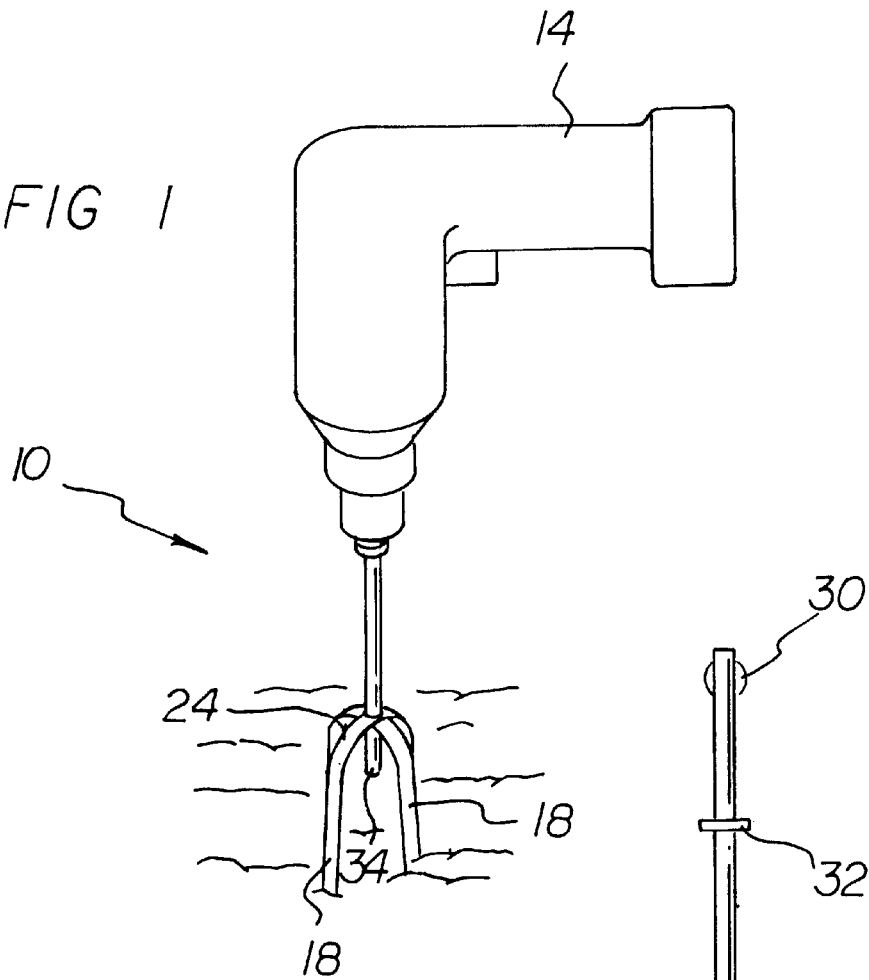
FIG. 1 is a perspective view of the preferred embodiment of the hand-held soil tilling system constructed in accordance with the principles of the present invention.

With reference now to the drawings, and in particular to FIG. 1 thereof, the preferred embodiment of the new and improved hand-held soil tilling system embodying the principles and concepts of the present invention and generally designated by the reference numeral 10 will be described.

The present invention, the hand-held soil tilling system 10 is comprised of a plurality of components. Such components are individually configured and correlated with respect to each other so as to attain the desired objective.

The new and improved hand-held soil tilling system for tilling the soil through the action of a hand-held beater with blades comprises, in combination a hand-held electrical machine 14, such as an L-shaped trigger-actuated drill, which is adapted to receive a tool for selectively causing the rotation thereof.

Figure 2:
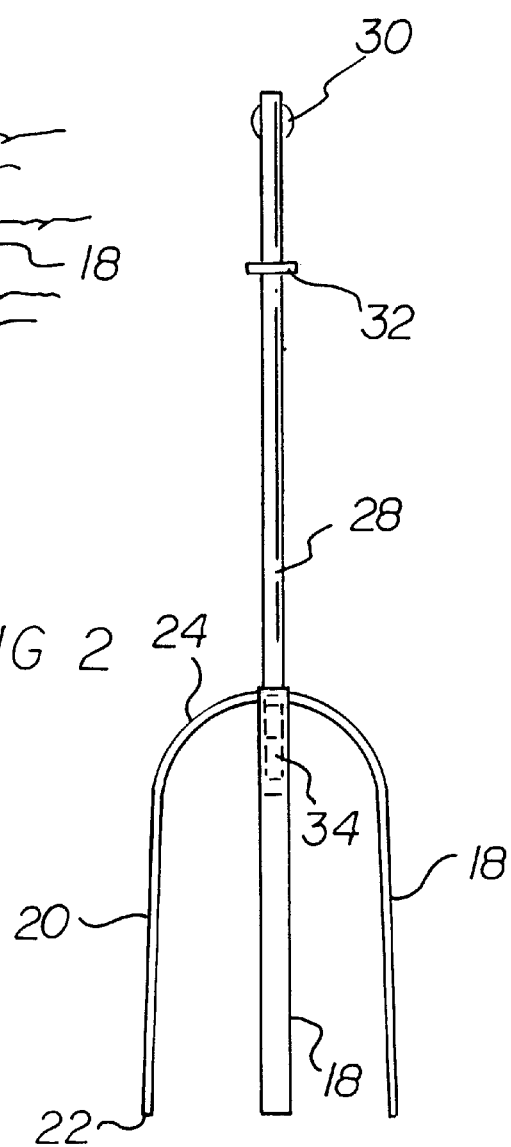
FIG. 2 is a side elevational view of the device shown in FIG. 1.

Also provided are four tiller components 18. Each tiller component includes an elongated planar central extent 20 formed with a triangular point 22 at its end. Each tiller component also includes an upper extent 24 in a curved configuration terminating adjacent to a common axis of rotation. The tiller components preferably reside in separate planes which define a box. As shown in FIGS. 2 & 4, the length of each central extent is about two and three times greater than the radius of curvature of the upper extents. The tiller components are flared slightly outwardly with the distance therebetween being greater adjacent to the lower ends than adjacent to the upper ends.

Also provided is a cylindrical coupling post 28 which has an upper extent formed with a pair of diametrically opposed semicircular projections 30 and a horizontally oriented annular flange 32 situated there below. By this structure, the coupling post is adapted to allow coupling with the electrical machine. The coupling post is further equipped with a lower end 34 and is adapted to fixedly receive thereadjacent the upper ends of the tiller components. With reference still to FIGS. 2 & 4, it is shown that a length of the tiller components is comparable to that of the coupling post.

As described hereinabove, the present invention is fabricated from forged stainless steel featuring four thin, vertical blades mounted on an 8-inch long shaft. The blades resemble beater attachments for an electric mixer in appearance except that each blade would end in a point to break up soil.

Instead of using traditional hand gardening tools, gardeners could insert the shaft of the garden beater into a small cordless drill to till soil. The four blades on the device make shorter work of tilling and require less effort to do the job. This convenient accessory is quite helpful when planting seeds for vegetable and flower gardens.

The appealing features of the present invention are its convenience, ease of use, light weight, ease of installation, small size and compactness, timesavings, reasonable price, and its ability to till garden soil quickly and effectively. This product is easily attachable to a small cordless drill in the same manner as traditional drill bits to provide gardeners with a fast, easy-to-use, and lightweight tilling tool. The tool is easy to clean and maintain.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hand-held soil tilling system for tilling soil through action of a hand-held beater with blades comprising, in combination:

a hand-held electrical machine adapted to receive a tool for selectively causing rotation thereof;

four tiller components, each tiller component including a substantially planar elongated central extent formed with a point at its end defined by side edges of the tiller component which converge to define a triangle which resides within a plane in which the central extent of the tiller component resides, each tiller component also including an upper extent in a curved configuration terminating adjacent to a common axis of rotation and with a length of each central extent being about three times greater than a radius of curvature of the upper extents, the tiller components being flared outwardly with a distance therebetween being greater adjacent to lower ends than adjacent to upper ends thereof; and a cylindrical coupling post having an upper extent formed with projections and a flange to allow coupling with the electrical machine and a lower end adapted to receive thereadjacent the upper ends of the tiller components.

* * * * *